May 25, 1926. 1,586,339
J. W. SUPORTER
AUTOMOBILE BUMPER
Filed March 20, 1924 2 Sheets-Sheet 1
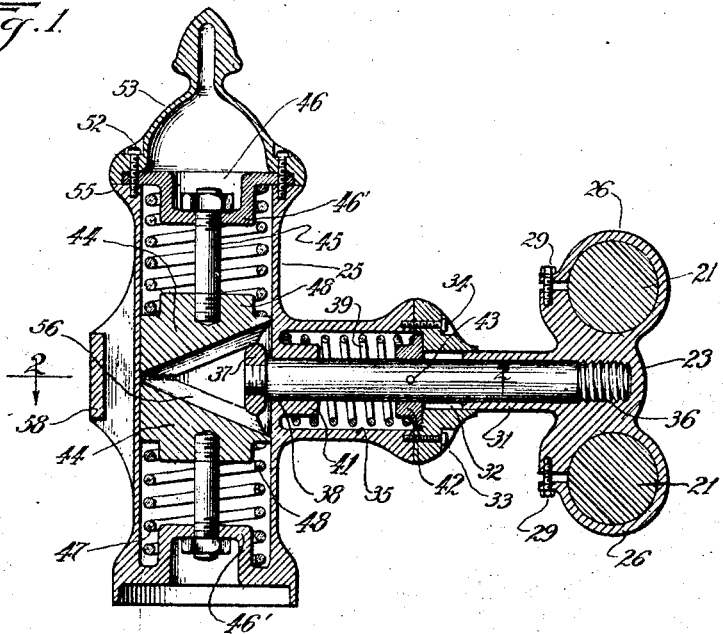
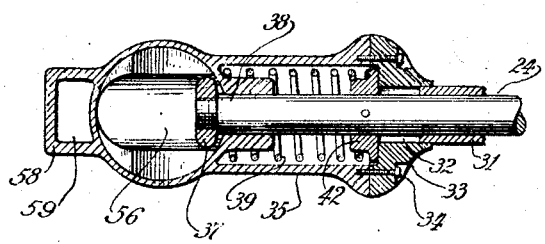
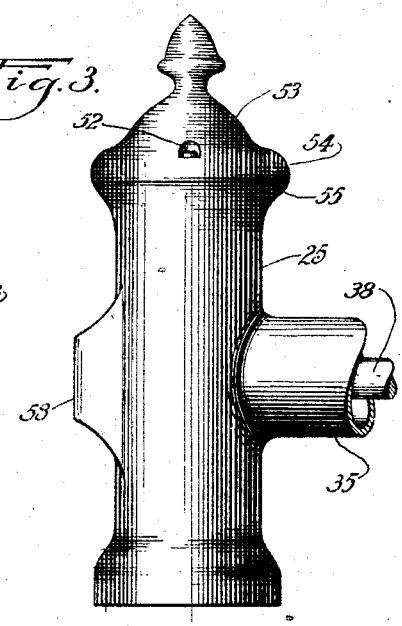
Inventor
James W. Suporter
By Munday, Clarke & Carpenter
Attys.

May 25, 1926.
J. W. SUPORTER
AUTOMOBILE BUMPER
Filed March 20, 1924
1,586,339
2 Sheets-Sheet 2
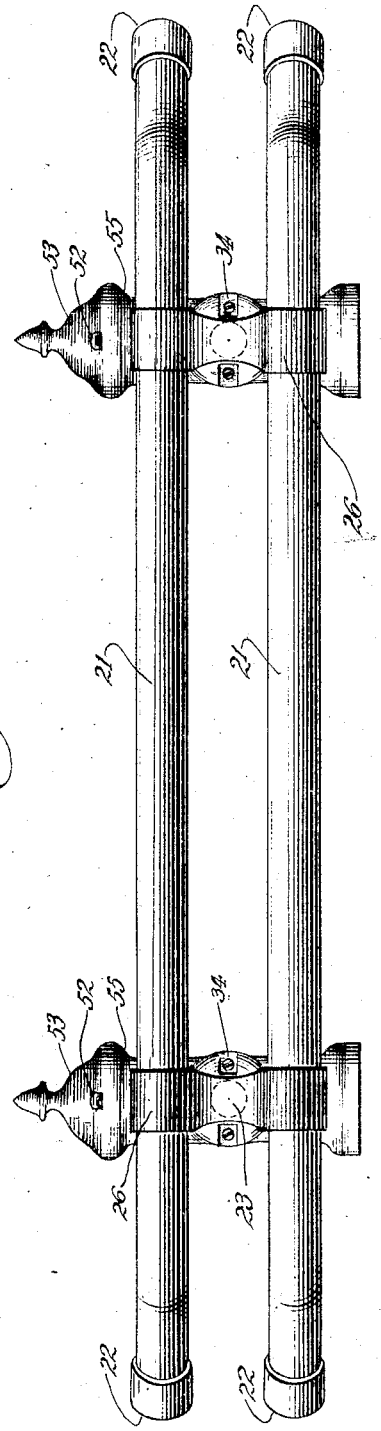
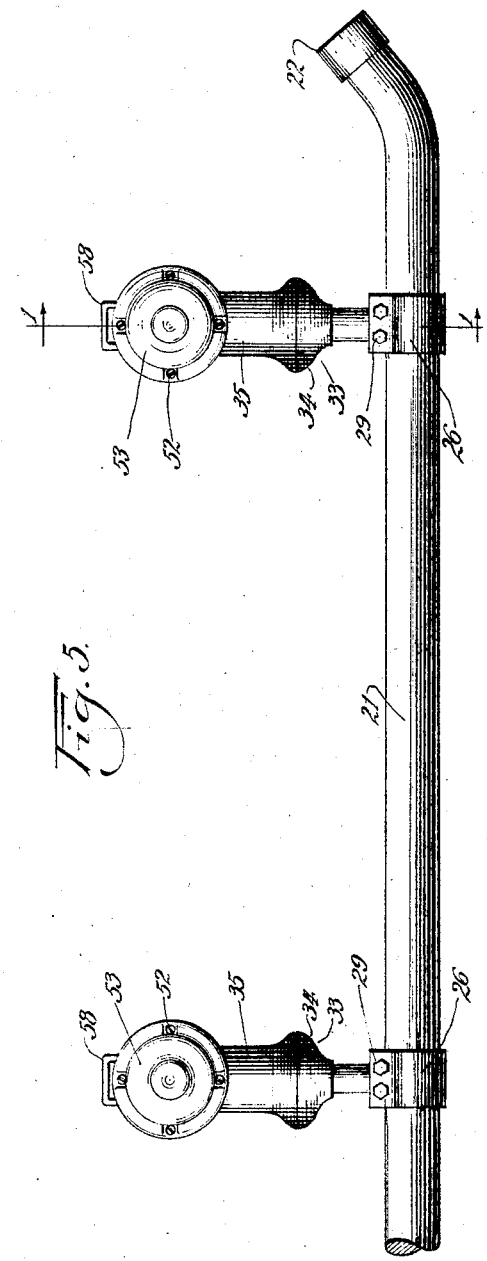

Patented May 25, 1926.

1,586,339

UNITED STATES PATENT OFFICE.

JAMES W. SUPORTER, OF CHICAGO, ILLINOIS, ASSIGNOR TO VOLATOR CO. INC., OF CHICAGO, ILLINOIS, A CORPORATION OF ILLINOIS.

AUTOMOBILE BUMPER.

Application filed March 20, 1924. Serial No. 700,484.

My invention relates to automobile bumpers and has for a primary object the provision of improved means for absorbing the shocks received by the bumper bars.

The construction provided by my invention involves the use of movable thrust members to which the bumper bars are secured and means for yieldingly resisting the rearward movement of said members, which means, in the preferred form of the invention shown on the drawings, comprises spring cylinders, but may, from certain aspects of the invention, employ hydraulic or other pressure in the place of springs.

The invention has also for an object the provision of a bumper of the character stated, which is of sturdy construction and adapted to withstand the shocks of service without breakage or necessity of frequent repair.

Numerous other objects and advantages of the invention will be apparent as it is better understood from the following description, which, taken in connection with the accompanying drawings, discloses a preferred embodiment thereof.

Referring to the drawings—

Figure 1 is a front-to-back sectional view, taken substantially on the section line 1—1 in Fig. 5;

Fig. 2 is a horizontal sectional view, taken substantially on the section line 2—2 in Fig. 1;

Fig. 3 is a side elevation of one of the thrust cylinders;

Fig. 4 is a front elevation of the bumper; and

Fig. 5 is a top plan view thereof.

The bumper as illustrated comprises transverse bumper bars 21, having enlargements, or caps, 22, at the ends thereof and being supported by brackets 23 mounted upon a thrust rod 24 extending rearwardly into a piston cylinder 25.

The bracket 23 provides upper and lower split clamps 26 adapted to be tightened upon the bumper bars by means of screws 29. A hollow extension 31 extends rearwardly from the body portion of the bracket 23 and takes into an aperture 32 in a cap 33 attached by screws 34 to a hollow projection 35 on the cylinder 25. The thrust rod 24 has its forward end threaded into the body of the bracket 23, as indicated at 36, and extends rearwardly through the bracket extension 31 and the hollow projection 35, a ball, or head, 37 being threaded onto the the inner end of said rod 24 after the latter has been inserted through an aperture 38 in the wall of the cylinder 25. A spring 39 is positioned within the hollow projection 35 and surrounds the rod 24. Said spring, at its inner end, is held in place by a boss 41 upon the cylinder wall and at its outer end bears against a collar 42 fixedly secured to the rod 24 by means of a pin 43. Said spring serves to hold the thrust rod and bumper bars normally in the outer position with the collar 42 bearing against the cap 33 and yieldingly resists inward movement of said rod.

Within the cylinder 25, I provide oppositely disposed pistons 44, mounted upon piston rods 45, which extend through depressed walls 46 at the opposite ends of the cylinder and are threaded into the pistons 44, though it will be understood that any preferred form of connection might be employed. Springs 47 are provided upon the piston rods 45 and bear against the pistons 44, which are provided with bosses 48 to accurately center the inner ends of the springs. At their outer ends, said springs are centered by means of bosses 46' on the walls, the bottom wall being integral with the cylinder. The top wall 46 is secured to the cylinder wall by means of screws 52, which also extend through caps 53 which close the cylinders at the top. Said caps preferably are of ornamental design, and, as shown, have rounded lower edges 54 resting upon the rounded upper edges 55 of the cylinder wall.

The pistons 44 are provided with beveled guideways, or cams, 56, in which the head 37 of the thrust rod 24 is disposed and it will be obvious that when sufficient stress is applied to the bumper bars, said head will be forced rearwardly, causing the pistons to separate against the tension of the springs 47. The member 37, however, does not engage the guideways, or cam surfaces, 56 until it reaches approximately the center of the cylinder, the thrust up to this point being absorbed by the springs 39. In this manner, distortion of the springs 47 is avoided. Said springs are relatively strong and oppose inward movement of the thrust member with considerable force. The springs 39, while somewhat lighter than the springs 47, are of sufficient strength to take up the initial portion of the thrust and, in fact, to resist all minor shocks received by the bumper bars.

The cylinders 25 are adapted to be secured to a forward part of the car, being provided for this purpose with a rearwardly extending boss 58 apertured at 59 to receive a bracket arm or the like which may be firmly secured thereto in any preferred manner.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:—

1. An automobile bumper, comprising transverse bumper bars, a thrust member to which said bars are secured, a cylinder supported from a forward part of the automobile, and means in said cylinder yieldingly resisting rearward movement of said thrust member and arranged at substantially right angles to the direction of movement of said member.

2. An automobile bumper, comprising transverse bumper bars, a thrust member to which said bars are secured, a cylinder supported from a forward part of the automobile, and a spring pressed piston in said cylinder yieldingly resisting rearward movement of said thrust member and arranged at substantially right angles to the direction of movement of said member.

3. An automobile bumper, comprising transverse bumper bars, a thrust member to which said bars are secured, a cylinder supported from a forward part of the automobile, and spring pressed pistons oppositely disposed in said cylinder and yieldingly resisting rearward movement of said thrust member.

4. An automobile bumper, comprising transverse bumper bars, a thrust member to which said bars are secured, a cylinder supported from a forward part of the automobile, and spring pressed pistons oppositely disposed in said cylinder and yieldingly resisting rearward movement of said thrust member, said pistons and thrust member being beveled and having a wedging action under stress applied to the bumper bars.

5. An automobile bumper, comprising transverse bumper bars, a thrust member to which said bars are secured, a cylinder supported from a forward part of the automobile, and spring pressed pistons oppositely disposed in said cylinder and yieldingly resisting rearward movement of said thrust member, said pistons and thrust member being beveled and being of such relative proportions as to cause a wedging action beginning approximately at the transverse center of the pistons.

6. An automobile bumper, comprising transverse bumper bars, a slidable thrust member to which said bars are secured, and means for yieldingly resisting the rearward movement of said thrust member, said means being arranged at substantially right angles to the direction of movement of said member.

7. An automobile bumper, comprising transverse bumper bars, a slidable thrust member to which said bars are secured, and spring means for yieldingly resisting the rearward movement of said thrust member, said means being arranged at substantially right angles to the direction of movement of said member.

8. An automobile bumper, comprising transverse bumper bars, a thrust member to which said bars are secured, a cylinder into which said thrust member extends, means in said cylinder for yieldingly resisting rearward movement of the thrust member, and yielding means positioned forwardly of said cylinder for absorbing minor shocks received by the bumper bars.

9. An automobile bumper, comprising transverse bumper bars, a thrust member to which said bars are secured, a cylinder into which said thrust member extends, means in said cylinder for yieldingly resisting rearward movement of the thrust member, and yielding means positioned forwardly of said cylinder for absorbing minor shocks received by the bumper bars, said last-mentioned means comprising a spring housed in a forward projection on said cylinder and exerting outward pressure upon said thrust member.

JAMES W. SUPORTER